United States Patent [19]

Lermann

[11] 4,073,582

[45] Feb. 14, 1978

[54] CAMERA SHUTTER

[75] Inventor: Peter Lermann, Feldkirchen, Germany

[73] Assignee: AGFA-Gevaert, A.G., Leverkusen, Germany

[21] Appl. No.: 778,138

[22] Filed: Mar. 16, 1977

[30] Foreign Application Priority Data

Mar. 18, 1976 Germany .............................. 2611351

[51] Int. Cl.² ............................................ G03B 19/18
[52] U.S. Cl. .................................................. 352/141
[58] Field of Search ....................... 350/266, 274, 275; 352/208, 210, 219, 220, 141; 354/226, 230, 250, 260, 254, 261, 255, 262, 264

[56] References Cited

U.S. PATENT DOCUMENTS

| 3,024,700 | 3/1962 | McClellan | 350/275 |
| 3,176,312 | 3/1965 | Reinsch | 352/141 |
| 3,188,935 | 6/1965 | Lieser et al. | 352/141 X |
| 3,277,803 | 10/1966 | Fukuoka | 352/141 |
| 3,542,462 | 11/1970 | Bertram | 352/141 |

Primary Examiner—Donald A. Griffin
Attorney, Agent, or Firm—Michael J. Striker

[57] ABSTRACT

A camera shutter has at least one diaphragm leaf which is mounted for angular displacement about a pivot axis. A cam element is mounted for rotation on the output shaft of a motor and is provided either with a planar surface formed with a spiral cam groove or with a conical surface formed with a conically spiral cam groove. A pin is fixed to the diaphragm leaf at a location laterally offset from the pivot axis and tracks the cam groove.

10 Claims, 4 Drawing Figures

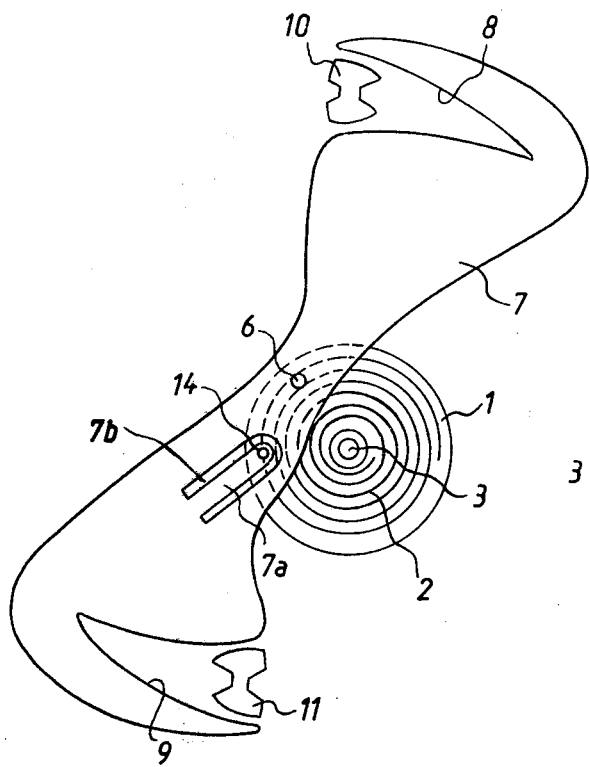
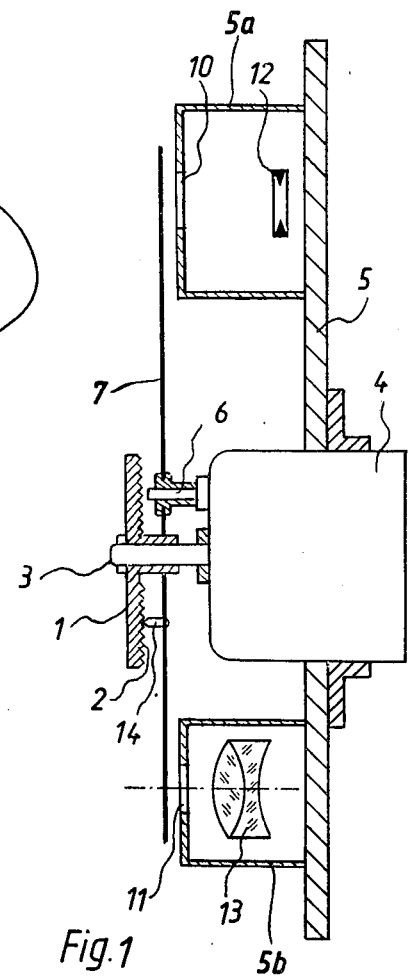
Fig. 2
Fig. 1

CAMERA SHUTTER

BACKGROUND OF THE INVENTION

This invention relates to a camera shutter, and more particularly to a shutter which can be used in photographic (i.e., still) cameras as well as in cinematographic cameras.

The prior art has proposed camera shutters having at least one diaphragm leaf which is displaced by a drive motor so as to vary the shutter aperture. However, these proposals are not entirely satisfactory, for a variety of reasons. The diaphragm leaf cannot be directly driven by the motor, so that a step-down transmission is required which, in the case of the prior-art proposals, is invariably rather complicated; this entails relatively high manufacturing costs. Also, the more complicated such a transmission, the bulkier it is which is a decided disadvantage in cameras, especially in view of the current trend to smaller and smaller cameras. In addition, the prior-art transmissions have relatively high friction losses which can be overcome only by providing a more powerful motor; this is undesirable not only from a cost point of view but also because it tends to more rapidly deplete the batteries which supply the motor with electrical energy.

SUMMARY OF THE INVENTION

Accordingly, it is an object of the invention to provide an improved camera shutter which avoids these disadvantages.

A more particular object is to provide such a camera shutter which is simple and inexpensive in its construction.

Another object is to provide a shutter of the type under discussion which utilizes a particularly simple, but very effective, step-down transmission.

A concomitant object is to provide such a shutter wherein the transmission requires very little space.

Still an additional object is to provide such a shutter having a step-down transmission which has very low friction losses.

In keeping with these objects, and with others which will become apparent hereafter, one feature of the invention resides in a shutter for cameras, i.e., still cameras as well as motion-picture cameras. Briefly stated, a shutter according to the invention may comprise at least one diaphragm leaf; pivot means mounting the diaphragm leaf angularly displaceable about a pivot axis; a cam element having an arcuate cam track; a prime mover connected with the cam element for rotating the same; and a cam follower tracking the cam track and engaging the diaphragm leaf at a location which is laterally offset from the pivot axis, so that rotation of the cam element results in angular displacement of the diaphragm leaf about the pivot axis.

The cam element may be a disk or plate having in one of its surfaces a spiral cam track contend on its axis of rotation. However, it may also be a conical member the circumference of which is formed with a conically tapering spiral cam track contend on its axis of rotation. The prime mover is advantageously a D.C. motor or a step motor. A low-friction transmission of the motor rotation to the diaphragm leaf can be obtained in advantageous manner by selection of the size and pitch of the cam track spiral convolutions.

The novel features which are considered as characteristic for the invention are set forth in particular in the apended claims. The invention itself, however, together with additional objects and advantages thereof, will be best understood from the following description of specific embodiments when read in connection with the accompanying drawings.

BRIEF DESCRIPTION OF THE DRAWINGS

FIG. 1 is a vertical section through an arrangement according to the invention;

FIG. 2 is a view of FIG. 1, looking to the right but with elements omitted for clarity;

DESCRIPTION OF THE PREFERRED EMBODIMENTS

Figure 3:
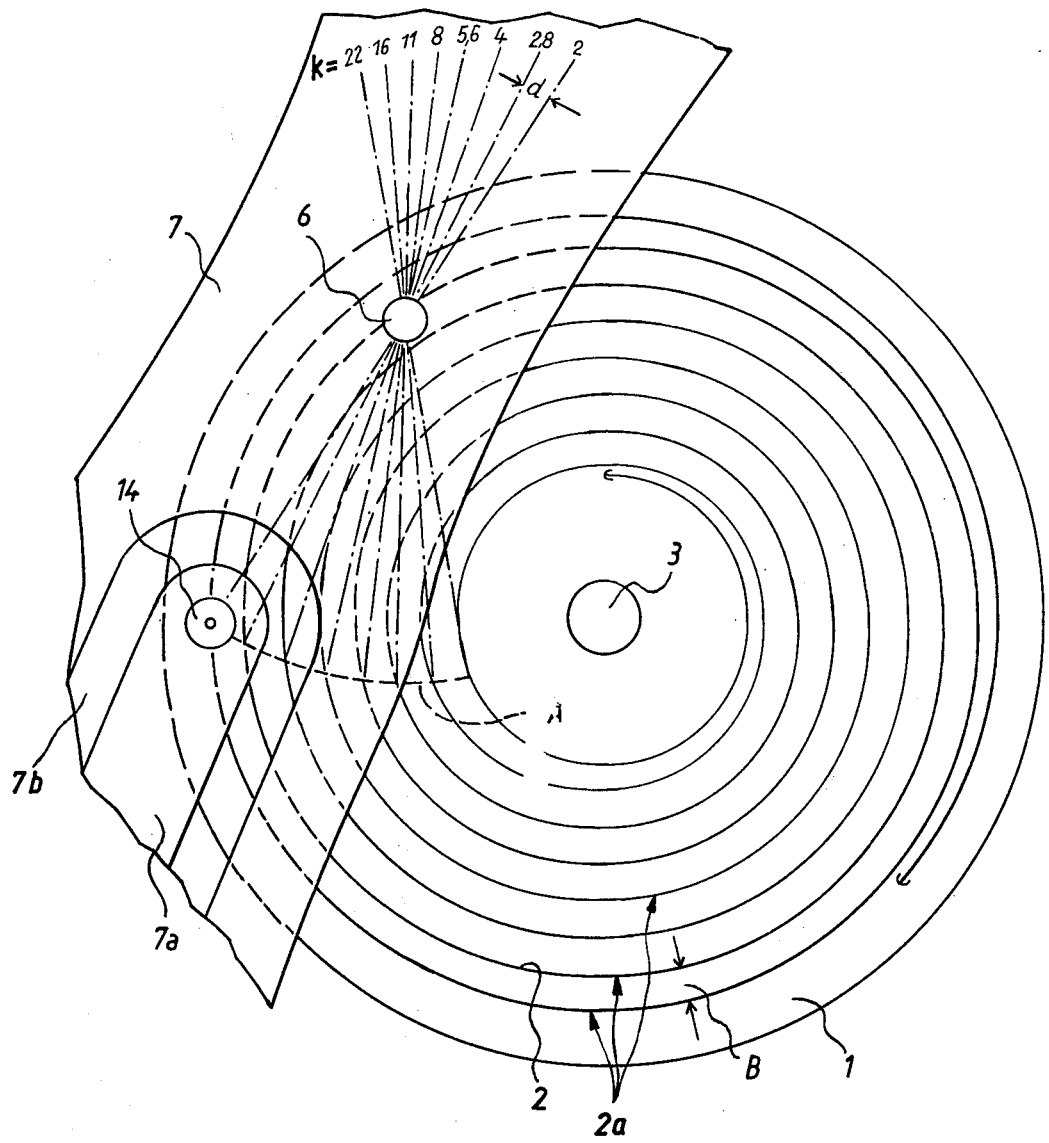
FIG. 3 is a view showing details of FIG. 2 on an enlarged scale.

A first exemplary embodiment of the invention is illustrated in FIGS. 1–3. It comprises a housing 5 (forming part of an otherwise not illustrated camera) on or in which there is mounted a prime mover 4, e.g., a step motor (a D.C. motor could also be used). The power source and the electrical connections to the same are not shown because they are known per se.

Housing 5 carries two casings 5a, 5b which are shown only diagrammatically. A light-sensitive element 12 (e.g., a photo-electric cell) is mounted in casing 5a so that light can impinge upon it through an opening 10. A lens or lens system (objective) 13 is located in casing 5b so that light can impinge upon it through an opening 11. The film which is to be exposed through the opening 11 is not believed to require illustration for an understanding of the invention.

A pivot 6 is mounted on the housing 5 and in turn mounts a diaphragm leaf 7 for angular displacement about the pivot axis which is defined by the pivot 6. Diaphragm leaf 7 (more than one may be provided) has in its end portions respective inwardly convergent slot-shaped cut-outs 8 and 9 which cooperate with the openings 10 and 11, respectively. Since, as shown in FIG. 2, the cut-outs 8 and 9 extend inwardly from opposite edges of the diaphragm leaf 7, and converge in mutually opposite directions, angular displacement of diaphragm leaf 7 about the axis of pivot 6 in counterclockwise direction causes the amount of light reaching the openings 10 and 11 through the cut-outs 8 and 9, respectively, to become uniformly diminished, and vice versa.

Diaphragm leaf 7 is also provided with a springy lobe 7a. In the illustrated embodiment the lobe 7a is obtained by stamping or otherwise forming a U-shaped slot 7b in the diaphragm leaf 7 so that lobe 7a remains as a tongue which can be pushed somewhat out of the plane of the diaphragm leaf 7 (i.e., in FIG. 2 in direction away from the viewer).

The lobe 7a is laterally offset from the axis of pivot 6 (i.e., eccentric relative thereto) and carries a projection which in the illustrated embodiment is in form of a pin 14.

A cam element is provided which here is in form of a disk 1 having a surface facing the diaphragm leaf 7 and formed with a spiral cam groove 2 having a plurality of convolutions 2a (see FIG. 3). Disk 1 is mounted on the output shaft 3 of motor 4 for rotation with the shaft. The free end of the pin 14, i.e., the end distal from diaphragm leaf 7, engages in the cam groove 2 into which it is pressed by the springyness of lobe 7a.

During rotation of the disk 1 by the motor 4 the pin 14 slides in the groove 2 and travels through successive convolutions 2a. In so doing it moves in a path A at least a portion of which extends at least substantially normal to the spiral, as shown. The position of pin 14 relative to the pivot axis of diaphragm leaf 7 about pivot 6, and its position relative to axis of rotation of shaft 3, is so selected that in the area of large shutter apertures (e.g., $K = 2.0$) large turning angles are obtained whereas in the area of small shutter apertures (e.g., $K = 22$) small turning angles are obtained for the diaphragm leaf 7. The spacing 3 between successive convolutions 2a of groove 2 is uniform in order to obtain this effect. Due to the positioning of the pin 14 relative to the axis of pivot 6 and the axis of shaft 3 combined with the preselected pitch (constant spacing between convolutions) of the spiral cam track, a logarithmic variation in the shutter aperture can be obtained.

Figure 4:
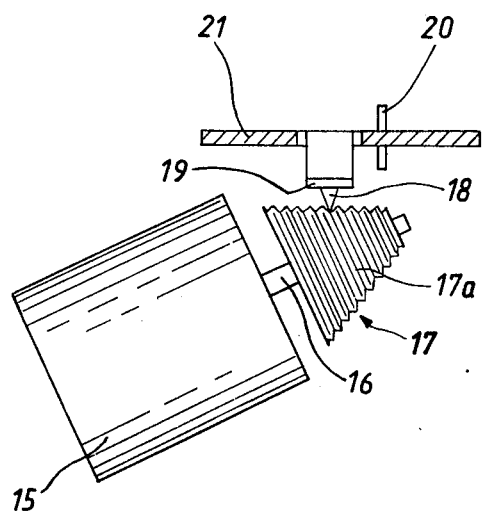
FIG. 4 is a fragmentary side view, partly in section, of another embodiment of the invention.

The embodiment shown in FIG. 4 corresponds in all except the specifically stated differences to the one in FIGS. 1–3. The elements omitted from the illustration in FIG. 4 are the same as in FIGS. 1–3.

However, in FIG. 4 the cam element 17 is a conical element, rather than a disk, and is mounted on the output shaft 16 of a motor (D.C. or step-motor) 15. The circumference of element 17 is formed with a cam groove 17a which, in keeping with the shape of element 17, is itself in form of a conically tapering spiral. A pin 18 is mounted on a lobe 19 (seen in endview and corresponding to the lobe 7a of FIGS. 1–3) of a diaphragm leaf 21 which is turnable about a pivot 20. The latter is secured to the (not illustrated) housing 5. In FIG. 4, unlike the preceding Figures, the shaft 16 is inclined (rather than normal to) the plane of the diaphragm leaf 21; the inclination is in accordance with the cone angle of the element 17 so that the periphery of element 17 extends parallel to the diaphragm leaf 21, as shown.

The operation and the results obtained with the embodiment of FIG. 4 correspond to those of FIGS. 1–3.

Evidently, various modifications may be made without departing from the concept of the invention. Thus, the lobes need not be of one piece with the respective diaphragm leaf but could be secured thereto. They need also not be springy. The pin 14 could be replaced by a differently shaped cam follower. The spacing between successive convolutions of the cam track need not be constant if a logarithmic variation in the shutter aperture is not desired.

While the invention has been illustrated and described as embodied in a camera shutter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a shutter for photographic and cinematographic cameras, a combination comprising at least one diaphragm leaf; pivot means mounting said diaphragm leaf angularly displaceable about a pivot axis; a cam element having an arcuate cam track; a prime mover connected with said cam element for rotating the same; and a cam follower tracking said cam track and engaging said diaphragm leaf at a location which is laterally offset from said pivot axis, so that rotation of said cam element results in angular displacement of said diaphragm leaf about said pivot axis.

2. A combination as defined in claim 1, wherein said cam track is a spiral track.

3. A combination as defined in claim 1, wherein said cam element has a substantially planar surface and said cam track comprises a spiral cam groove formed in said surface.

4. A combination as defined in claim 1, wherein said cam track is a spiral track of conical shape.

5. A combination as defined in claim 1, wherein said cam element is a conical element having a circumferential surface formed with a conical spiral cam groove formed therein.

6. A combination as defined in claim 1, wherein said diaphragm leaf has a springy lobe and said cam follower is a projection carried by said lobe and resiliently yieldably urged into engagement with said cam track by said springy lobe.

7. A combination as defined in claim 1, wherein said cam track comprises a plurality of convolutions of successively different diameters.

8. A combination as defined in claim 7, wherein the positions of said pivot axis, of said cam follower and of the axis of rotation of said cam element relative to each other are so selected that in response to rotation of said cam element said cam follower travels in a path which at least in part extends normal to the axis of rotation of said cam element.

9. A combination as defined in claim 7, wherein successive ones of said convolutions are spaced from one another by constant distances, and wherein the positions of said pivot axis, of said cam follower and of the axis of rotation of said cam element are so selected relative to each other that upon rotation of said cam element said diaphragm leaf effects a logarithmic variation in the shutter aperture.

10. A combination as defined in claim 1, wherein said diaphragm leaf is planar and said cam element is a conical element having an axis of rotation which coincides with its cone axis and is inclined with reference to the plane of said diaphragm leaf, said conical cam element having a circumferential surface formed with said cam track in form of a conical spiral groove.

* * * * *